United States Patent
Yuan et al.

(10) Patent No.: US 10,075,389 B1
(45) Date of Patent: Sep. 11, 2018

(54) TIERED PRIORITY SYSTEM AND CALLOUT PERFORMANCE BOOSTER

(71) Applicant: International Business Machines Corporation, Armonk, NY (US)

(72) Inventors: Jack C. Yuan, San Jose, CA (US); Elvis B. Halcrombe, San Jose, CA (US); Jeffrey L. Maddix, Morgan Hill, CA (US); Li-Chuan J. Yang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/705,687

(22) Filed: Sep. 15, 2017

(51) Int. Cl.
| | |
|---|---|
| G06F 15/173 | (2006.01) |
| H04L 12/927 | (2013.01) |
| G06F 17/30 | (2006.01) |
| H04L 29/06 | (2006.01) |
| H04L 29/08 | (2006.01) |

(52) U.S. Cl.
CPC ...... *H04L 47/805* (2013.01); *G06F 17/30377* (2013.01); *G06F 17/30587* (2013.01); *H04L 67/42* (2013.01); *H04L 69/16* (2013.01); *H04L 67/34* (2013.01)

(58) Field of Classification Search
CPC ....... H04L 47/805; H04L 67/42; H04L 69/16; H04L 67/34; G06F 17/30377; G06F 17/30587
See application file for complete search history.

(56) References Cited

U.S. PATENT DOCUMENTS

| | | | |
|---|---|---|---|
| 5,978,840 A | 11/1999 | Nguyen et al. | |
| 6,640,244 B1 | 10/2003 | Bowman-Amuah | |
| 7,206,805 B1 | 4/2007 | McLaughlin, Jr. | |
| 8,533,667 B2 | 9/2013 | Alexander et al. | |
| 9,398,622 B2 | 7/2016 | Lawson et al. | |

(Continued)

OTHER PUBLICATIONS

Disclosed Anonymously, "Locking prioritisation to support Qualities of Service in cloud-based messaging service instances", An IP.com Prior Art Database Technical Disclosure, IP.com No. IPCOM000243027D, IP.com Electronic Publication Date: Sep. 9, 2015, 3 pages.

(Continued)

*Primary Examiner* — John B Walsh
(74) *Attorney, Agent, or Firm* — Edward J. Wixed, III

(57) ABSTRACT

A method, computer program product and system uses a tiered priority system having three types of callout messages for use by a transaction processing system: (i) callout with a reserved path; (ii) callout with priority; and (iii) default priority callout with sharing mode. An online transaction program (OTP) issues a "reserve call" associated with a "callout with a reserved path". In response, a reserve call processor initiates an asynchronous request to build an express socket path, and returns a special dispatchable unit of work identifier (special DUOW ID). The OTP subsequently issues any number of callouts to be sent on the express socket path using the special DUOW ID. A callout with priority dynamically allocates a path for sending a callout message, without queuing. A sharing mode combines a group of callout messages (types (i), (ii), and/or (iii) above) into a single TCP/IP send without queuing.

12 Claims, 14 Drawing Sheets

(56) References Cited

U.S. PATENT DOCUMENTS

2007/0061457 A1* 3/2007 Li .................. H04L 29/12132
709/225
2015/0381710 A1* 12/2015 Kish .................. H04L 67/10
709/201

OTHER PUBLICATIONS

Lyon, Helene, "Modernization of IMS Applications and Data Access", Total Solution Event for System zTM 2012, Sep. 18-20, 2012, IBM Forum Brussels, Redbooks®, © 2012 IBM Corporation, 52 pages.

Yuan et al., "Tiered Priority System and Callout Performance Booster", U.S. Appl. No. 15/831,417, filed Dec. 5, 2017, 44 pages.

IBM Appendix P, list of patents and patent applications to be treated as related, filed herewith, 2 pages.

* cited by examiner

TIERED PRIORITY SYSTEM AND CALLOUT PERFORMANCE BOOSTER

BACKGROUND OF THE INVENTION

The present invention relates generally to the field of transaction processing, and more specifically to processing multiple callout messages in a transaction processing system.

A transaction processing system (TPS) receives a request from a client system (such as an online transaction program (OTP)), sends the request to a server system where the server performs operations in accordance with the request. If the request calls for a response, the server sends a return message and/or data to the requesting client system.

A callout is a request that can be initiated by an online transaction program (OTP) at any time during an application program flow. The OTP directs the callout request to an external program (for example, to retrieve needed information, or to cause the external program to perform some operations). For example, a checking account program (which is an OTP) in a commercial bank computer system issues a callout request to a database server, to obtain certain customer information. The database server returns the requested customer information and the checking account program can then continue processing.

SUMMARY

According to an aspect of the present invention, there is a method, computer program product and/or system that performs the following operations (not necessarily in the following order): (i) receiving a call from a first online transaction program (first OTP); (ii) in response to receiving the call: generating an express socket path, generating a dispatchable unit of work and a corresponding token identifier (token ID), sending the token ID to the OTP; (iii) receiving, from the first OTP a first callout message, where the first callout message includes the token ID; (iv) sending the first callout message on the express socket path; (v) receiving a first response corresponding to the first callout message; and (vi) sending the first response to the first OTP.

According to another aspect of the present invention, there is a method, computer program product and/or system that performs the following operations (not necessarily in the following order): (i) receiving, from the first OTP a second callout message, where the second callout message includes the token ID; (ii) sending the second callout message on the express socket path; (iii) receiving, a second response corresponding to the second callout message; and (iv) sending the second response to the first OTP.

According to another aspect of the present invention, there is a method, computer program product and/or system that performs the following operations (not necessarily in the following order): (i) receiving a plurality of callout messages from one or more second online transaction programs (second OTPs); (ii) combining the plurality of callout messages into a shared callout message; (iii) sending the shared callout message to a TCP/IP server; (iv) receiving a shared return message from the TCP/IP server; (v) extracting a plurality of return messages from the shared return message; and (vi) returning the plurality of return messages to the respectively corresponding one or more second OTPs.

According to another aspect of the present invention, there is a method, computer program product and/or system that performs the following operations (not necessarily in the following order): (i) receiving a second callout message where the second callout message is of a first priority level; (ii) assigning an available socket to the second callout message; (iii) receiving a third callout message where the third callout message is of a second priority level; and (iv) reassigning the available socket to the third callout message.

DETAILED DESCRIPTION

Embodiments of the present invention introduce three types of callout messages, and a sharing mode, for enhancing throughput in a transaction processing system: (i) callout with a reserved path (associated with a reserve call); (ii) callout with priority; and (iii) default priority callout with the sharing mode.

An online transaction program (OTP) sends a reserve call to a "reserve call processor" before making an associated callout with reserved path. In response to the reserve call, the reserve call processor performs at least the following actions: (a) initiates an asynchronous request to build an express socket path for the associated callout call; and (b) returns a special dispatchable unit of work identifier (a unique token ID, sometimes herein referred to as a special DUOW ID) to the OTP. The online transaction program uses the token ID, for one or more subsequent callouts, for throughput. The token ID corresponds to a dispatchable unit of work (DUOW, see definition below under the section heading DEFINITIONS). The OTP subsequently issues a callout on the express socket path, using the token ID.

A callout with priority (item (ii) above) dynamically allocates a path for sending the callout message, without queuing, for high performance.

A callout with sharing mode (item (iii) above) combines a group of callout messages (the message may be of any priority level) into a single TCP/IP send without queuing. A sharing mode algorithm for callout messages uses a destination table concept and incorporates two timeout logics (TCP/IP send timeout and TCP/IP receive timeout) to send/receive callout messages.

The present invention will now be described in detail with reference to the Figures.

Figure 1:
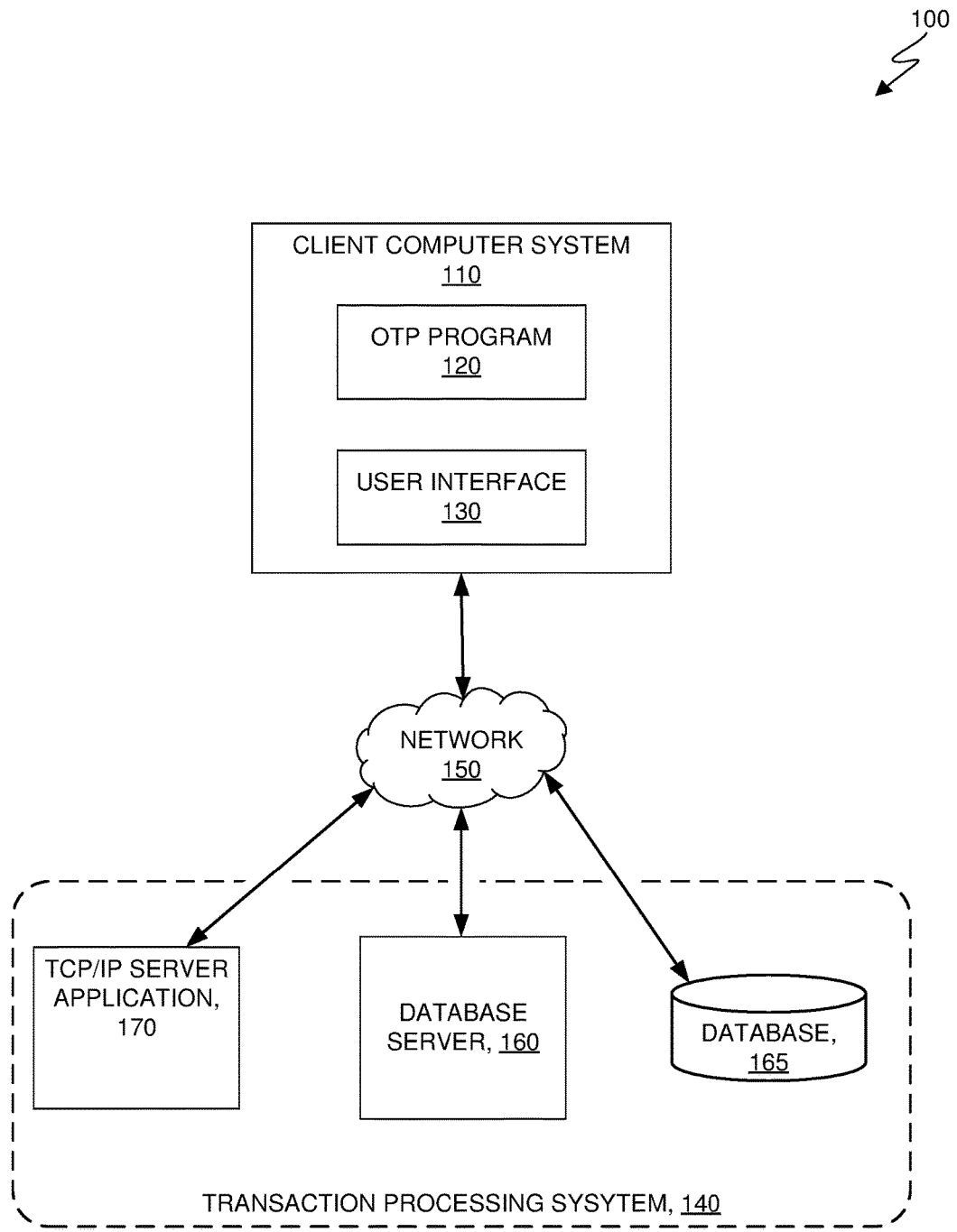
FIG. 1 is a functional block diagram depicting a computing environment in accordance with at least one embodiment of the present invention.

FIG. 1 is a functional block diagram depicting a computing environment 100 in accordance with an embodiment of the present invention. Computing environment 100 includes: client computer system 110; online transaction processing application 120 (OTP 120); user interface 130; transaction processing system 140 (TPS 140); network 150 (for example, the internet); database server 160; database 165; and TCP/IP server application 170. Client computer system 110 can be any of a desktop computer, a laptop computer, a specialized computer server, or any other computer system known in the art. In some embodiments, client computer system 110 represents a computer system utilizing clustered computers and components to act as a single pool of seamless resources when accessed through network 150. In general, client computer system 110 is representative of any electronic device, or combination of electronic devices, capable of executing machine-readable program instructions, as described in greater detail with regard to FIG. 10.

Figure 2:
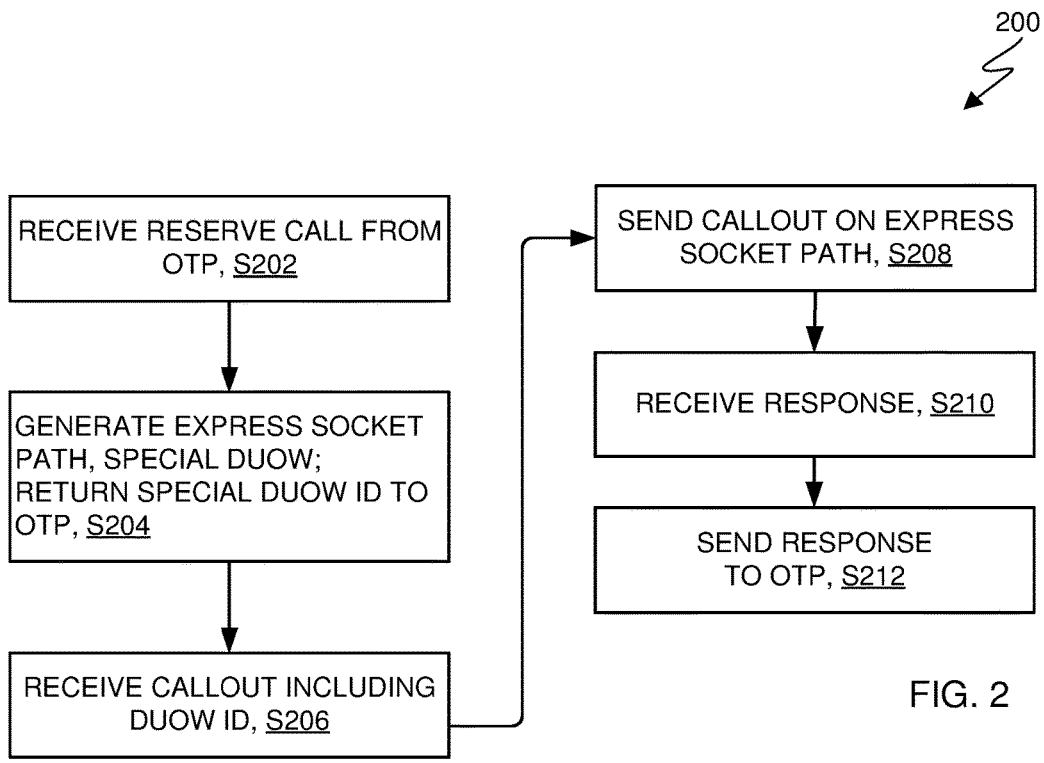
FIG. 2 is a flowchart showing a method performed, at least in part, in accordance with at least one embodiment of the present invention.
Figure 3:
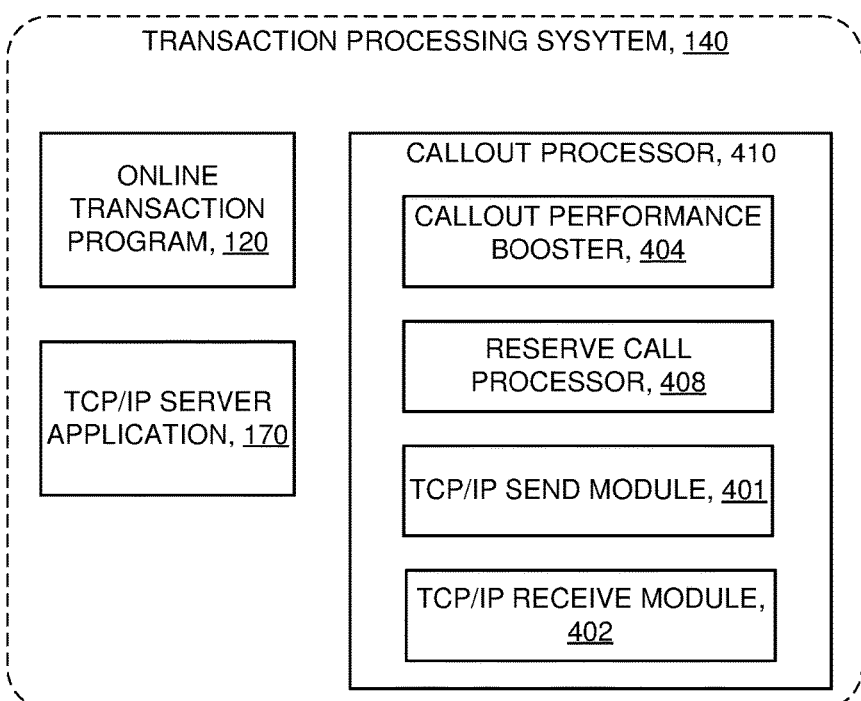
FIG. 3 is a block diagram showing a machine logic (for example, software) portion of a system in accordance with at least one embodiment of the present invention.

FIG. 2 shows flowchart 200 depicting a method according to the present invention. FIG. 3 shows transaction processing system 140 for performing at least some of the method operations of flowchart 200. This method and associated software will now be discussed, over the course of the following paragraphs, with extensive reference to FIG. 2 (for the method operation blocks) and FIG. 3 (for the software blocks).

Processing begins at operation S202, where reserve call processor 408, of callout processor 410, of transaction processing system 140 (TPS 140) receives a reserve call from online transaction program 120 (OTP 120) of TPS. The reserve call signals, among other things, that the OTP will be issuing one or more reserve callouts having a high message priority.

Processing proceeds at operation S204, where reserve call processor 408, of callout processor 410, in response to receiving the reserve call at operation S202, generates an express socket path, a special DUOW, and a corresponding special DUOW ID (sometimes herein referred to as a Token ID). Reserve call processor 408 returns the special DUOW ID to OTP 120. The special DUOW may be reused by OTP 120, for any number of high priority callout messages, thereby avoiding the overhead of creating a new DUOW for each callout message and destroying the new DUOW when the callout message (and subsequent response message if appropriate) has run its course.

Processing proceeds at operation S206, where callout performance booster 404 (CPB 404), of callout processor 410, receives a callout message from OTP 120, where the callout message includes the special DUOW ID. The special DUOW ID signals to callout processor 410 that the callout message is of the reserved priority type.

Processing proceeds at operation S208 CPB 404, where TCP/IP send module 401, of callout processor 410, sends the callout message on the express socket path reserved at operation S204. CPB 404 bypasses conventional operations including packaging the callout data and placing the callout message in a send queue.

Processing proceeds at operation S210, TCP/IP receive module 402, of callout processor 410, receives a response to the callout message. The response makes use of the express socket path reserved at operation S204. CPB 404 bypasses conventional operations including receiving the response in a response queue and un-packaging the response data.

Processing proceeds at operation S212 where CPB 404 sends the response to OTP 120.

Some embodiments of the present invention may recognize one, or more, of the following facts, potential problems and/or potential areas for improvement with respect to the current state of the art with respect to application callout message sent to an external TCP/IP server application: (i) a transaction processing system (TPS) processes callout messages in a first-in-first-out (FIFO) queue, one at a time; (ii) once a callout message reaches the queue, its wait time is directly related to the number of other callout messages existing in the queue ahead of it, and the amount of time it takes to process those messages; (iii) extensive bottleneck delays in the processing of callout messages can occur in cases where, for example, a) many messages are enqueued in a short amount of time causing large queue buildup, b) an individual message takes a long time to process, leading to longer queue time for subsequent callout messages in the queue, c) TCP/IP network problems can cause a long delays, and/or d) some combination of items a, b, and c.

In some embodiments of the present invention, a three-tier priority system provides a user the flexibility to choose which callout messages from a given application will be granted specialized priority access to existing TCP/IP sockets.

Tier 1—Application Reserve Call (sometimes herein referred to as "Reserve Call") exclusively assigns a socket for all callout messages from a given application. The socket stands ready to exclusively deliver messages from the transaction that makes this call.

Tier 2—Priority Call (sometimes herein referred to as "Callout with Priority") assigns priority status to a given message for available sockets. Callout with priority dynamically allocates its own path for sending a message, without queuing, for high performance. Callout with priority takes the next available socket and makes it immediately available for messages specified as higher priority.

Tier 3—Default Message Priority, for access to the available socket pool. A Default Message Priority call allows lower priority messages to yield socket assignments to calls having higher priority specifications (that is, Application Reserve Call and Priority Call). Default Message Priority takes advantage of a callout performance booster (CPB) sharing mode (SM) which groups messages for both send and receive across the TCP/IP network. The CPB uses a timer based algorithm to ensure system responsiveness. The callout performance booster is sometimes herein referred to as "high performance option".

Each of the three priority specifications (Application Reserve Call, Priority Call, and Default Message Priority) is further enhanced by being processed by the CPB.

The CPB offers true parallelism for application callout messages by establishing a DUOW (Dispatchable Unit of Work). A DUOW is a set of control blocks that represent a unit of work within a transaction processing system. Each DUOW can be activated or dispatched into available hardware processors via a transaction processing system dispatcher. The CPB DUOWs have an additional timer algorithm to establish allowable message timeout intervals for message responses. Upon timeout of a message response, the CPB DUOW rejects the callout response. A DUOW is used by each of the three priority tiers (reserve call, priority call and the default message priority) to ensure that parallelism is used to enhance performance for all callout messages.

Each of the three priority tiers (Reserve Call, Priority Call and the Default Message Priority) uses a DUOW, to ensure that parallelism is used to enhance performance for all callout messages.

An application which specifies the Reserve Call creates a DUOW at the time Reserve Call is made. The DUOW exists for the duration of the application. All subsequent callout messages created by the application, and each callout message response received back from the network, reuse the DUOW. This avoids the overhead that would otherwise be involved with multiple DUOW creations and subsequent terminations. The application thereby receives the premium performance benefits.

An application which sends messages using the Priority Call, creates a DUOW at the time each Priority Call is made. The DUOW is terminated after send if no response is required. If a response message is required, the DUOW is terminated upon processing the response or at message timeout. This ensures that parallelism is used while processing the messages specified as Priority Call messages. The priority socket assignment previously described (see Tier 2—Priority Call above) sends the messages across available sockets with minimal delay spent waiting for sockets to become available.

For messages sent using the Default Message Priority, DUOWs are created at the time the message enters the CPB to ensure parallelism. Further, Default Message Priority uses a Sharing Mode Processor which introduces a sharing mode algorithm for callout messages within a transaction processing system (TPS). This algorithm uses a destination table concept and incorporates timeout logic for both TCP/IP send and TCP/IP receive callout messages.

The Sharing Mode Processor enables a set of default callout messages to be buffered and delivered by a single TCP/IP SEND using the same socket. A destination table manages the messages. Each entry in the destination table includes TCP/IP address info, sharing mode state (SM state), sharing mode timer token (SM timer token), current sizing of all the messages, and DUOW chain for the messages. Query, Update, Add, and Delete operations for the table entries are supported to maintain the destination table. Sharing mode enables a more efficient use of TCP/IP sockets and network traffic to reduce overall queueing within the TPS.

Some embodiments of the present invention use the tiered priority system and Callout Performance Booster together to allow for prioritization and parallelism of application callout messages and to reduce queueing and delays for messages within a TPS.

Some embodiments of the present invention may recognize one, or more, of the following facts, potential problems and/or potential areas for improvement with respect to the current state of the art: (i) online transaction program callout messages (OTP callout messages) are sent to an external TCP/IP server application, one at a time; (ii) if a callout message is blocked, following callout messages are delayed, or cannot be delivered; (iii) if a callout message is delayed, following callout messages are delayed for the transaction programs; (iv) the transaction processing system operates on a first-in-first-out (FIFO) protocol; and/or (v) the send queue and receive queue modules, of conventional transaction processing system callout processing logic, may become bottlenecks with respect to callouts and corresponding responses.

Figure 4A:
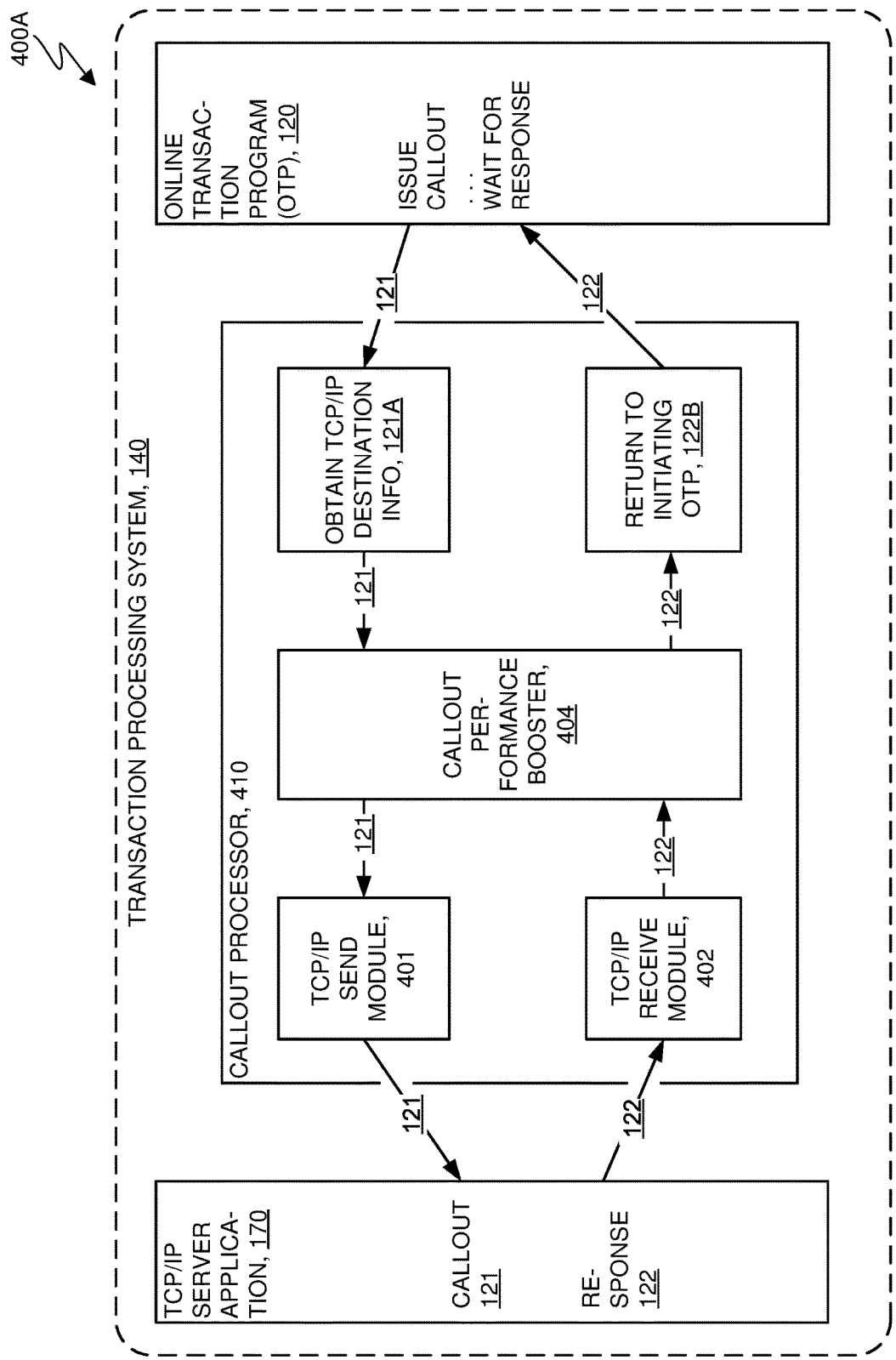
FIG. 4A is a functional block diagram showing a callout performance booster (high performance option) in accordance with at least one embodiment of the present invention.

Turning now to block diagram 400A of FIG. 4A, a callout/response sequence, performed in some embodiments of the present invention, is illustrated. Functional block diagram 400A shows a callout performance booster (sometimes herein referred to as a high performance option) for callout in accordance with at least one embodiment of the present invention. The callout performance booster is sometimes herein referred to as a high performance option.

Online transaction program 120 (OTP 120) issues callout message 121 to callout processor 410 which performs the following operations: (i) obtains TCP/IP destination information (121A); (ii) passes callout message 121 to callout performance booster 404 (bypassing conventional operations of (a) packaging the callout data and (b) placing the callout in a send queue); (iii) callout performance booster 404 performs certain operations (discussed below, with respect to FIGS. 4B, 4C, 4E, and 5) and passes callout message 121 to TCP/IP server application 170 through TCP/IP send 121B.

If callout 121 requires a response, TCP/IP server application 170 produces response 122, and returns the response to callout processor 410, which performs the following continuing operations: (i) receives (122A) response 122 from TCP/IP server application 170; (ii) processes the response by callout performance booster 404; and (iii) returns the response to the initiating online transaction program (OTP 120, in the present example embodiment). By using callout performance booster 404, callout processor 410 avoids overhead and delays conventionally associated with: (a) packaging callout data; (b) and placing the request in a send queue (for the callout); (c) placing the response in a receive queue; and (d) packaging received data (for the response).

Figure 4B:
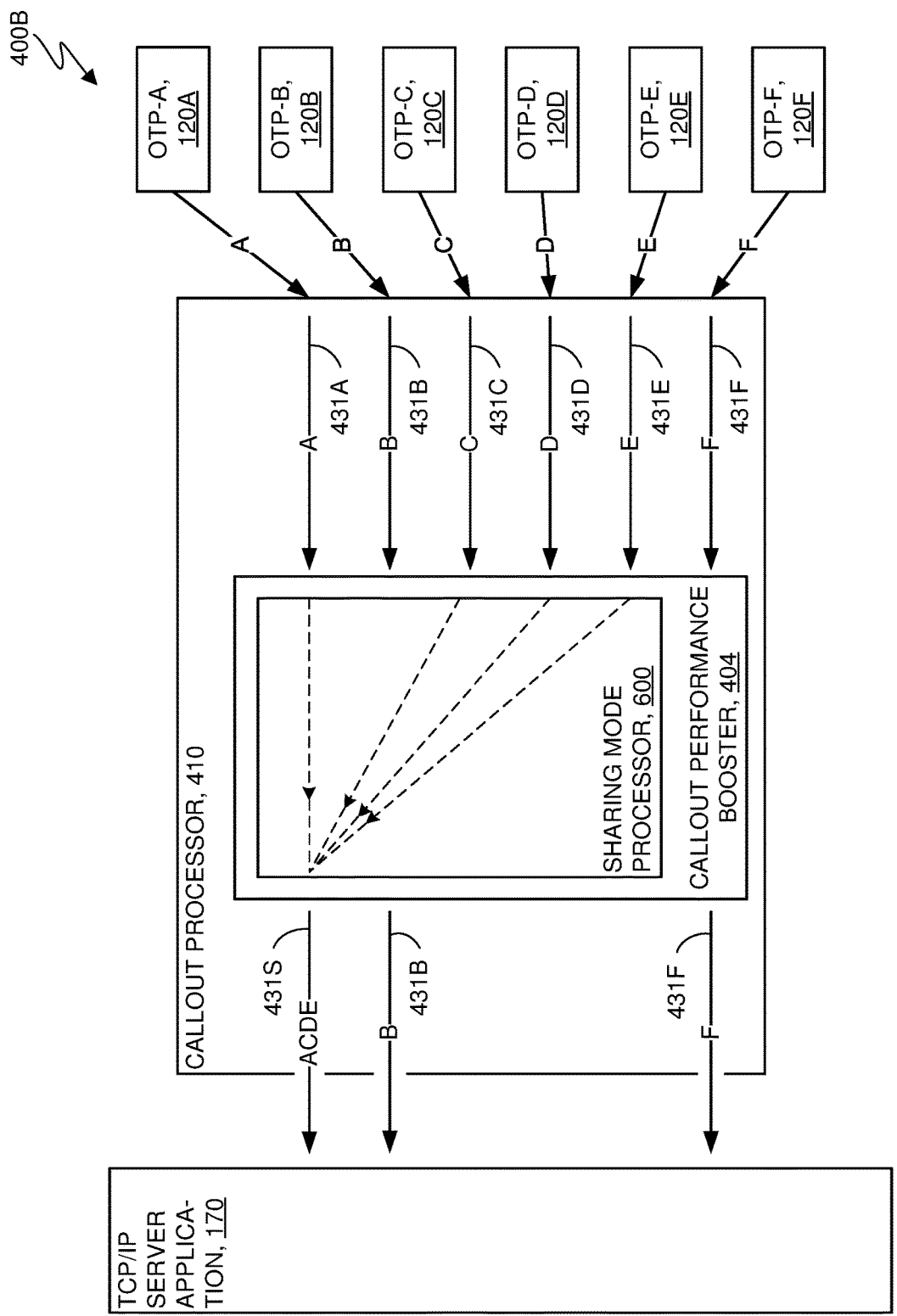
FIG. 4B is a functional block diagram showing an outbound callout message flow through a sharing mode processor in accordance with at least one embodiment of the present invention.

Discussion now turns to functional block diagram 400B of FIG. 4B. In some embodiments of the present invention, callout performance booster 404 offers true parallelism for processing callouts. Sharing mode processor 600, of callout performance booster 404, combines multiple callout requests into a shared message. The callout requests may be "reserve calls", "priority calls", or "default message priority calls". In some embodiments of the present invention, the multiple callout requests are all directed to the same TCP/IP address. The total size of the shared message may be limited to a threshold size, for example 50 KB. In the example embodiment of FIG. 4B, multiple online transaction processing systems (OTP-A 120A-OTP-F 120F) each issues a callout (callout-A 431A-callout-F 431F, respectively, also referred to as callout messages A-F, respectively). In the embodiment of FIG. 4B, callout messages A, C, D, and E, are each directed to a first TCP/IP address. Consequently, sharing mode processor 600 groups callout messages A, C, D, and E, into shared message 431S. (In some embodiments of the present invention, criteria other than the destination TCP/IP addresses are used to select which callouts are grouped by the sharing mode processor.) In the embodiment of FIG. 4B, callout messages B and F are directed to second and third TCP/IP addresses, respectively, and are sent separately (not grouped) to the respective TCP/IP address(es). Callout processor 410 sends three callout messages to TCP/IP server application 170. The three messages comprise: (i) shared message 431S (sent as a single TCP/IP send); (ii) callout message 431B; and (iii) callout message 431F. The three messages are not necessarily sent concurrently—each one is sent without queuing or delay once it is ready. TCP/IP server application 170 receives the messages.

Figure 4C:
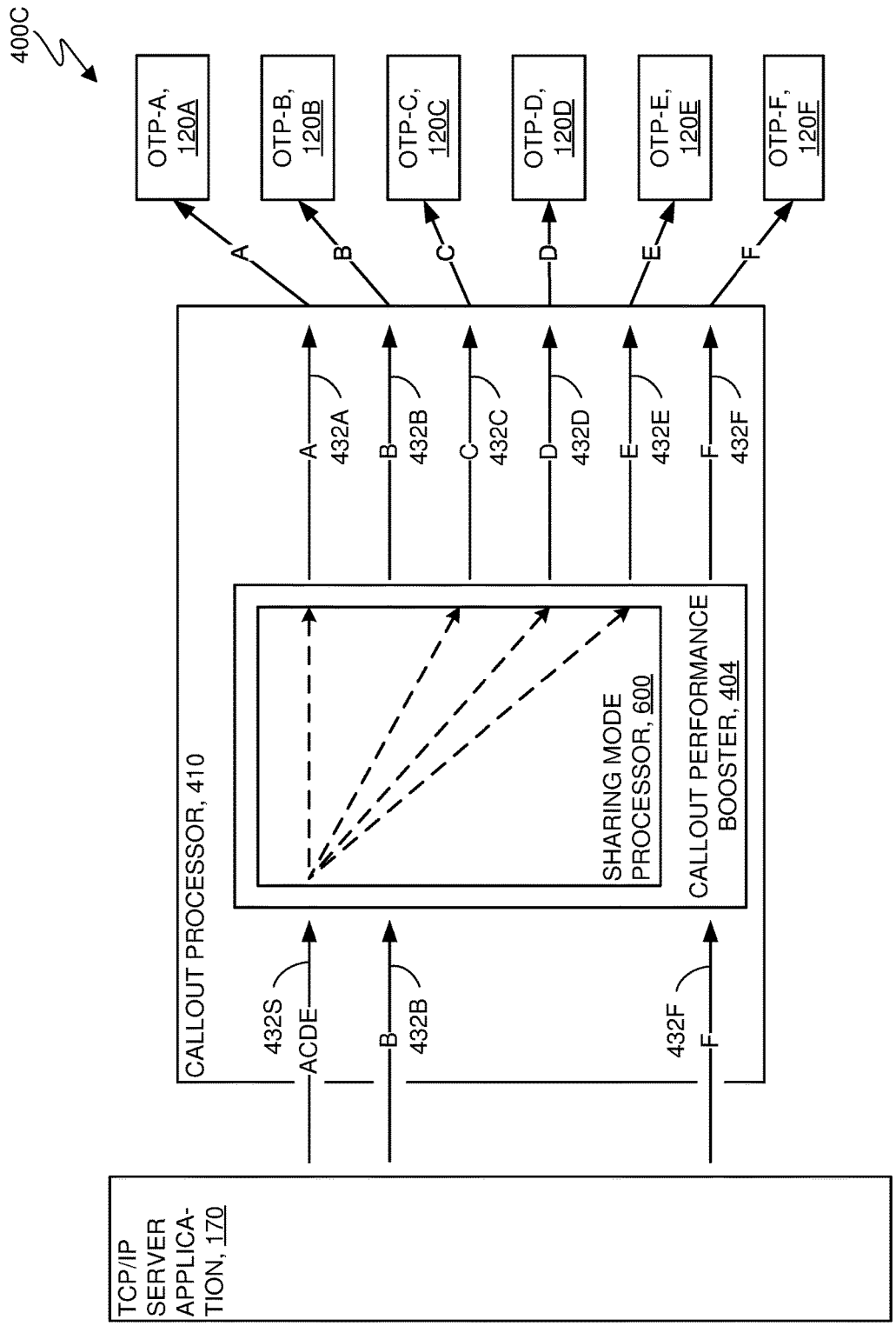
FIG. 4C is a functional block diagram showing an inbound response message flow through a sharing mode processor in accordance with at least one embodiment of the present invention.

Continuing with the example embodiment, and turning now to functional block diagram 400C of FIG. 4C, TCP/IP server application 170 parses shared message 431S, to extract callout messages 431A, 431C, 431D, and 431E, and processes each one separately to produce respective responses 432A, 432C, 432D, and 432E. The TCP/IP server further processes callout messages 431B and 431F to produce respective responses 432B and 432F.

TCP/IP server application 170 groups response messages 432A, 432C, 432D, and 432E, into shared response message 432S. Criteria for grouping the return messages are based on factors such as: (i) the time each response is completed (to insure that responses quickly determined are not held up waiting to be grouped with a slowly determined, or non-forthcoming response); (ii) TCP/IP address from where each response was generated; and/or (iii) the sizes of the response messages (to limit the shared response size to a pre-determined threshold, for example 50 KB). In the embodiment of FIG. 4C, the TCP/IP server application returns three return messages: shared response 432S; response 432B; and (iii) response 432F.

Sharing mode processor 600, of callout performance booster 404, receives the return messages and parses out return messages 432A, 432C, 432D, and 432E from shared return message 432S. The callout performance booster returns each return messages (432A-432F) to its respective online transaction program (OTP-A 120A-OTP-F 120F).

Further discussion is provided below with respect to callout performance booster 404 (with reference to FIG. 5) and sharing mode processor 600 (with reference to FIG. 6).

Figure 4D:
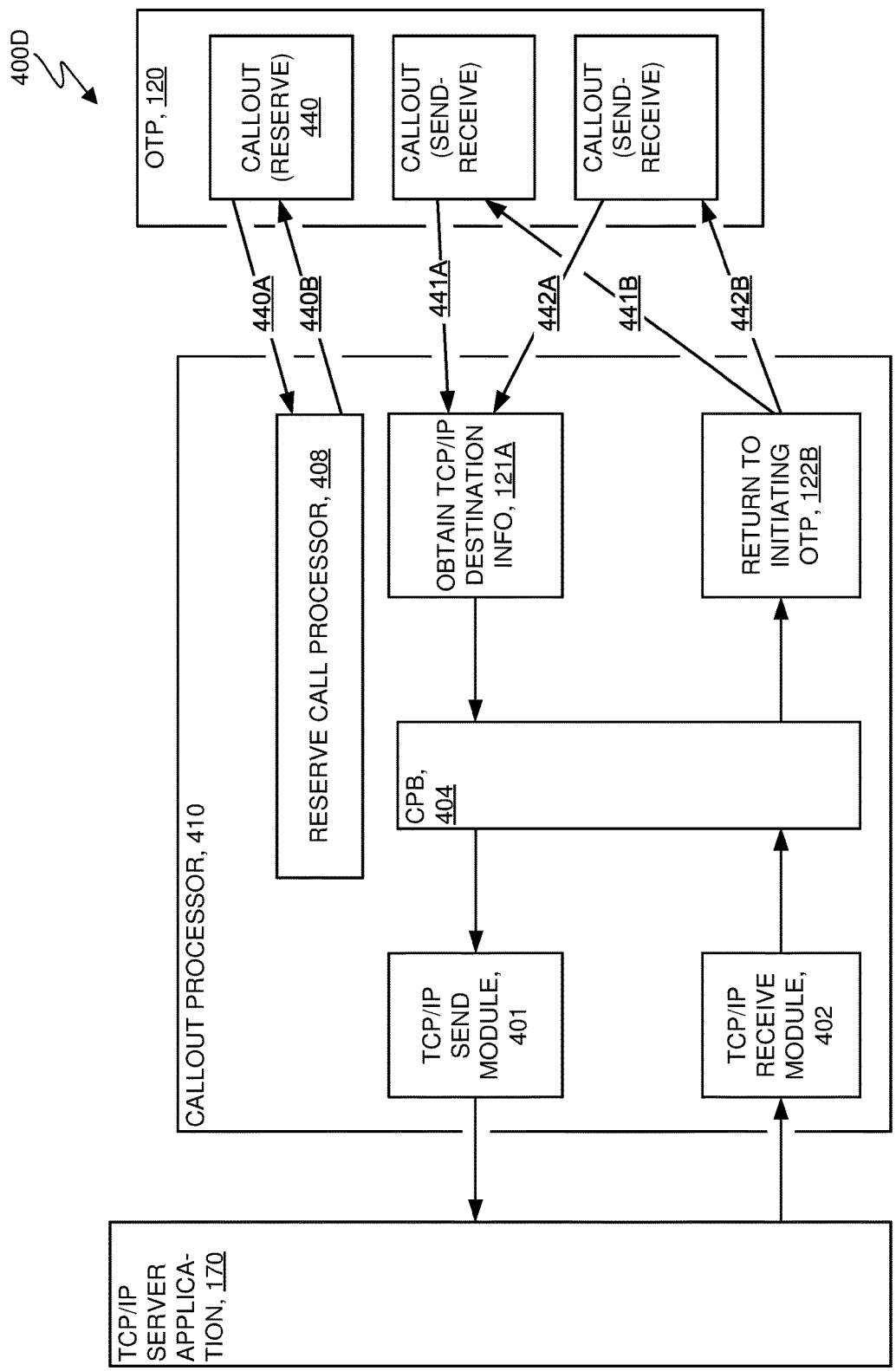
FIG. 4D is a functional block diagram showing a reserve callout message flow in a portion of a transaction callout processor in accordance with at least one embodiment of the present invention.

Functional block diagram 400D of FIG. 4D shows a callout with reserve in accordance with at least one embodiment of the present invention. In this example, online transaction program 120 (OTP 120) sends a reserve call (440A) to reserve call processor 408 of callout processor 410. The reserve call processor returns (440B) a special dispatchable unit of work (special DUOW; not separately shown in the Figures; sometimes herein referred to as a special reserved DUOW) to the OTP. OTP 120 sends a first reserve callout message (441A) and a second reserve callout message (442A) to callout processor 410. OTP 120 may issue the first and second reserve callout messages concurrently, consecutively, or in any other temporal relationship relative to one another. The first and second reserve callout messages are both associated with the special DUOW. The reserve callout messages: (i) obtain TCP/IP destination information (121A); and (ii) proceed to callout performance booster 404. Callout performance booster 404 performs certain operations (some of which are discussed below, with respect to FIG. 4E), in accordance with the first and second reserve callout messages (441A and 442A, respectively), and sends the callout messages to TCP/IP server application 170 through TCP/IP send 121B.

TCP/IP server application 170, processes the first and second reserve callout messages, (441A and 442A, respectively), to generate respective return messages (441B and 442B). The TCP/IP server application sends the return messages to callout processor 410, where they are received. The TCP/IP server application may return the first and second reserve return messages concurrently, consecutively, or in any other temporal relationship relative to one another. CPB 404 processes the return messages and returns (122B) each message to the initiating OTP 120.

Figure 4E:
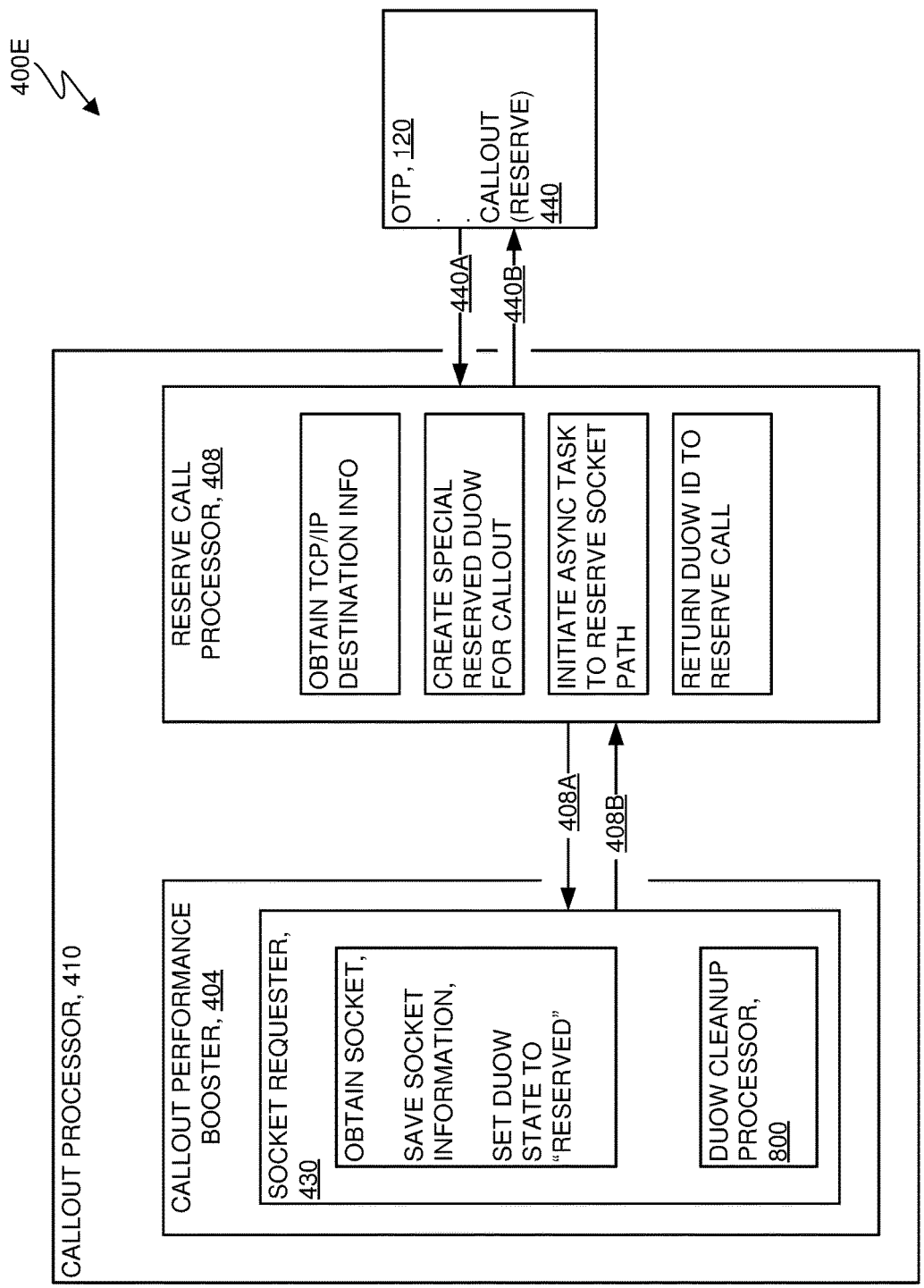
FIG. 4E is a functional block diagram showing a reserve call message flow in a portion of a transaction callout processor in accordance with at least one embodiment of the present invention.

Functional block diagram 400E of FIG. 4E shows at least some functional aspects of reserve call processor 408, and socket requester 430 of callout performance booster 404 in some embodiments of the present invention. As an example, online transaction program 120 issues a reserve callout 440A to reserve call processor 408. In response, the reserve call processor performs the following operations: (i) obtains TCP/IP destination information based on the reserve callout; (ii) creates a special reserved DUOW and a corresponding DUOW identifier (DUOW ID); (iii) initiates an asynchronous task to reserve a socket path (for example, by sending signal 408A to socket requester; (iv) receives, via signal 408B, reserved socket information in return; and (v) returns the special reserved DUOW identifier (DUOW ID) to OTP 120.

Further with respect to item (iii) in the paragraph above, socket requester 430, in response to receiving a signal 408A, obtains a socket, saves the socket information, sets the state of the special reserved DUOW to "RESERVED", and sends the socket information back to reserve call processor 408 via signal 408B.

Callout performance booster 404 further comprises a DUOW cleanup processor, a component to clean up a DUOW for callout, once the DUOW is terminated. Machine logic of the DUOW cleanup processor (Logic-D) is diagrammed in flowchart 800 of FIG. 8. A DUOW created for a "reserved" callout, in some embodiments of the present invention, is terminated only when the online transaction program ends.

Figure 5A:
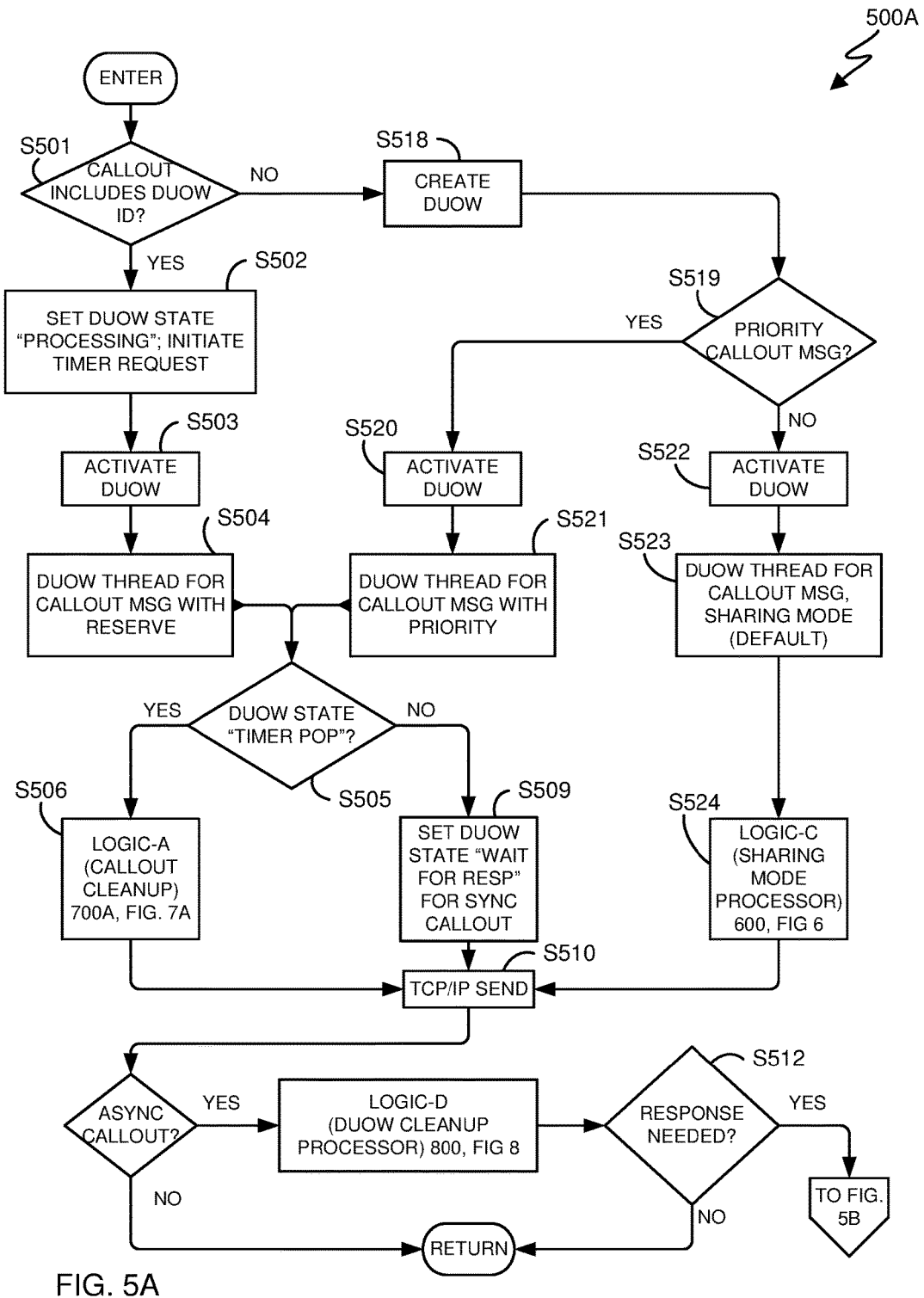
FIG. 5A is a flowchart showing a first machine logic method performed, at least in part, by a callout performance booster, in accordance with at least one embodiment of the present invention.

Flowchart 500A of FIG. 5A shows a first machine logic (for example, software) portion of callout performance booster 408, in accordance with some embodiments of the present invention. This first machine logic portion of CPB 408 concerns handling of callout messages directed to TCP/IP server application 170 (see FIGS. 4A, 4B, 4C, and 4D). Flowchart 500A includes the following operations (with process flow among and between the operations as shown by arrows in FIG. 5): S501, S502, S503, S504, S505, S506, S509, S510, S512, S518, S519, S520, S521, S522, S523, and S524.

With respect to decision S501 (Callout includes DUOW ID?), if the callout includes a DUOW ID, it means that an application reserve call was previously made.

With respect to operation S502 (Set DUOW state "Processing"; initiate timer request), the timer request is based on the callout timeout value.

With respect to operation S504 (DUOW thread for callout message with reserve), operation S504 includes the following operations: (i) packaging the callout data; (ii) preparing a callout prefix based on the DUOW ID; and (iii) retrieving socket information from the DUOW.

With respect to operation S518 (create DUOW): once the DUOW is created, it's state is set to "processing" and a timer request for the DUOW is initiated. In some embodiments of the present invention, the timeout value for the DUOW timer is based on a timeout value associated with the callout.

With respect to operation S521 (DUOW thread for callout message with priority), operation S521 includes: (i) packaging the callout data; (ii) preparing a callout prefix with the DUOW ID; (iii) obtaining a socket for the callout; and (iv) saving the socket in the DUOW.

With respect to operation S523 (DUOW thread for callout messages, sharing mode (default)): based on TCP/IP destination, multiple sets of callout messages, may use "sharing mode" to share the connection path to deliver the messages. Each sharing mode for a TCP/IP destination has a unique sharing mode timer token. The timer token is obtained via a timer request. In some embodiments of the present invention, a sharing mode timeout value is on the approximate order of one one-hundredth (0.01) of the callout timeout value.

Figure 5B:
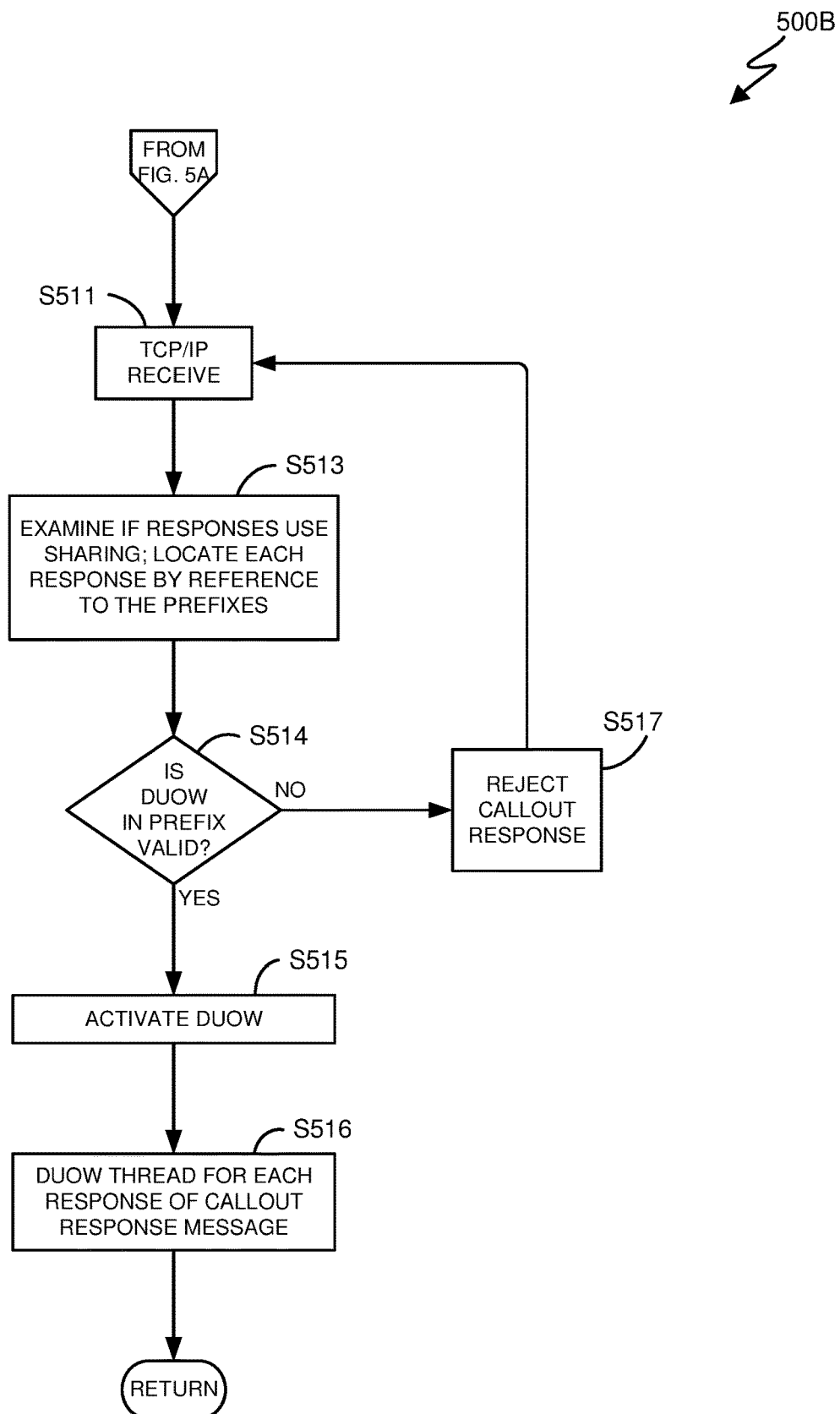
FIG. 5B is a flowchart showing a second machine logic method performed, at least in part, by a callout performance booster, in accordance with at least one embodiment of the present invention.

CPB flowchart 500B of FIG. 5B shows a second machine logic (for example, software) portion of callout performance booster 408, in accordance with some embodiments of the present invention. This second machine logic portion of CPB 408 concerns handling of return messages from TCP/IP server application 170 (see FIGS. 4A, 4B, 4C, and 4D). Flowchart 500B includes the following operations (with process flow among and between the operations as shown by arrows in FIG. 5): S511, S513, S514, S515, S516, and S517.

With respect to operation S516 (DUOW thread for each response of callout response message), operation S516 includes the following operations: (i) updating DUOW state to "response received"; (ii) packaging the response data; (iii) obtaining the originating callout program information; (iv) canceling the DUOW timer; and (v) freeing the DUOW.

Figure 6:
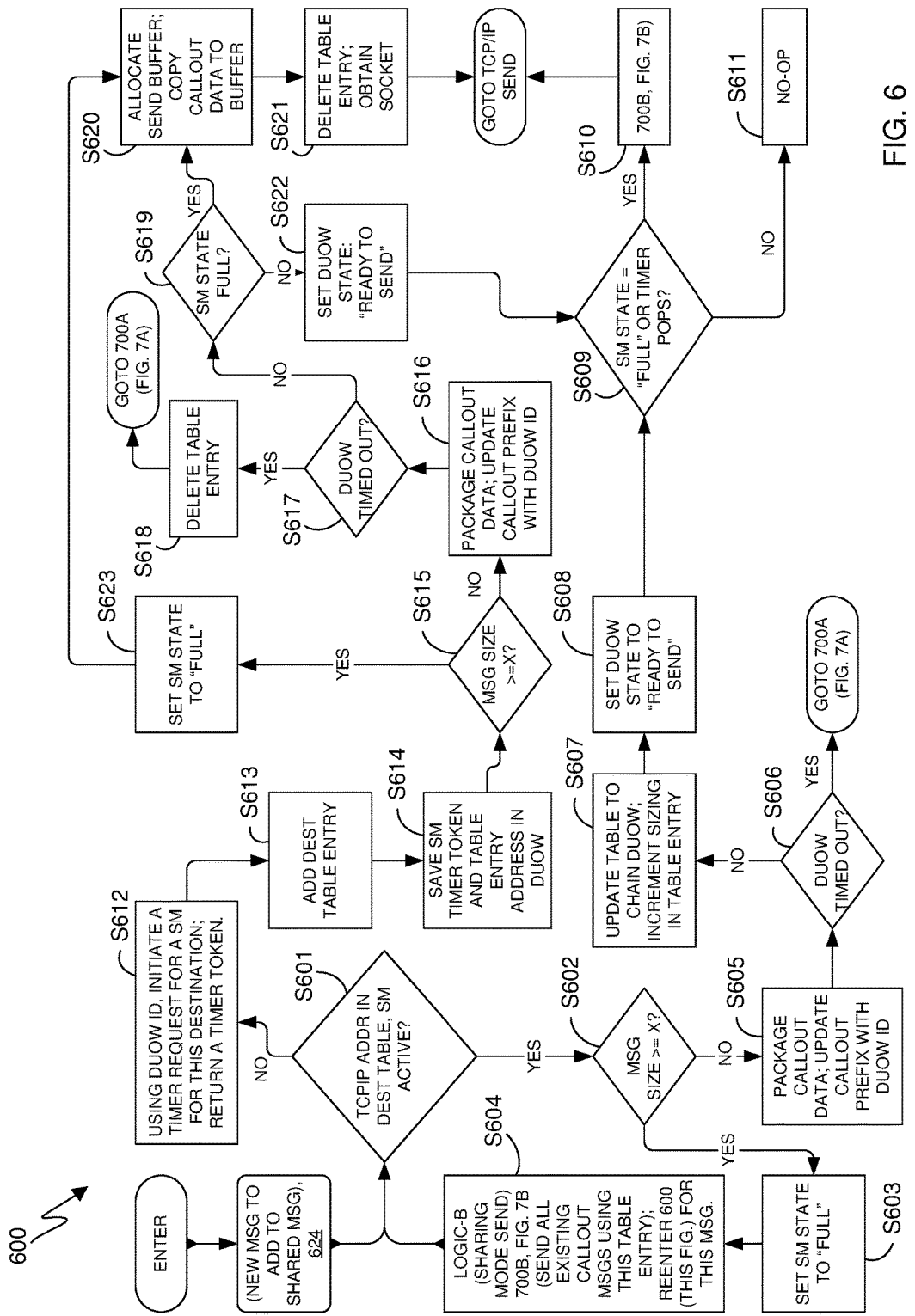
FIG. 6 is a flowchart showing a method performed, at least in part, by a sharing mode processor, in accordance with at least one embodiment of the present invention.

Flowchart 600 of FIG. 6 shows a machine logic (for example, software) portion of sharing mode processor (also see sharing mode processor 600 of FIGS. 4B and 4C), in accordance with some embodiments of the present invention. Flowchart 600 (Logic-C) includes the following operations (with process flow among and between the operations as shown by arrows in FIG. 6): S601, S602, S603, S604, S605, S606, S607, S608, S609, S610, S611, S612, S613, S614, S615, S616, S617, S618, S619, S620, S621, S622, S623. Logic-C is at least a portion of a machine logic method that is associated with a sharing mode processor in some embodiments of the present invention.

The sharing mode processor machine logic of flowchart 600 is initiated when a new message arrives that is to be added to a shared request. Some items of note with respect to flowchart 600 are discussed in the following few paragraphs.

With respect to decision S602 (Message size >=X? where the symbol ">=" means greater than or equal): Size threshold (X) is a pre-determined maximum combined size of callout messages for a single TCP/IP send using sharing mode. More precisely, X is the pre-determined maximum size of the resultant shared message. The purpose of the size threshold is to avoid sending an unacceptably large shared message. If current sizing recorded in the destination table plus the size of the new message is greater than the threshold (decision S602 "Yes" branch), processing proceeds at operation S603. In some embodiments the threshold X is set at 50 KB, although X may be set to any value.

Figure 7B:
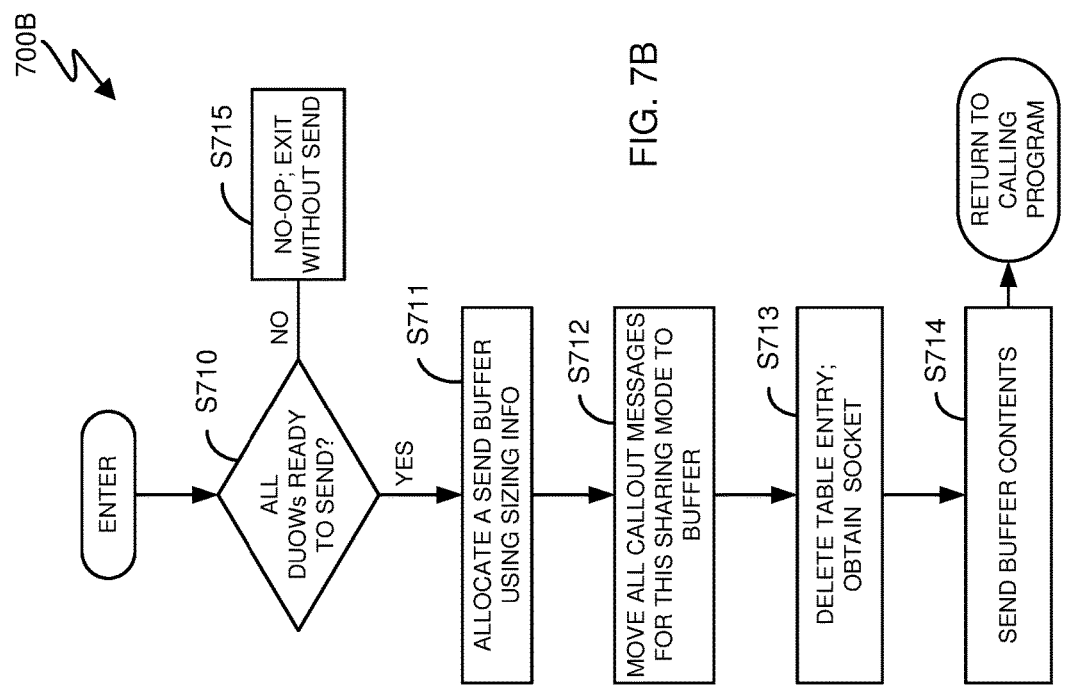
FIG. 7B is a flowchart showing a send messages method performed, at least in part, by a sharing mode process, in accordance with at least one embodiment of the present invention.

With respect to operation S604: A call to Logic-B (flowchart 700B) of FIG. 7B is made when the shared message would exceed a size limit if the new message (624) is added to the shared message (see S602, "Yes" branch). In response, 700-B is called (operation S604) to send the shared message without inclusion of the new message. Then Logic-C (flowchart 600) is re-entered at operation S601, where building of a new shared message, including the new message (624), is started.

With respect to operation S613 (Add destination table entry"): included in the new destination table entry is at least the following information with respect to the new message (624): target TCP/IP address; sharing mode timer token; current sharing sizing; sharing mode state "ACTIVE"; and chain of DUOW.

Figure 7A:
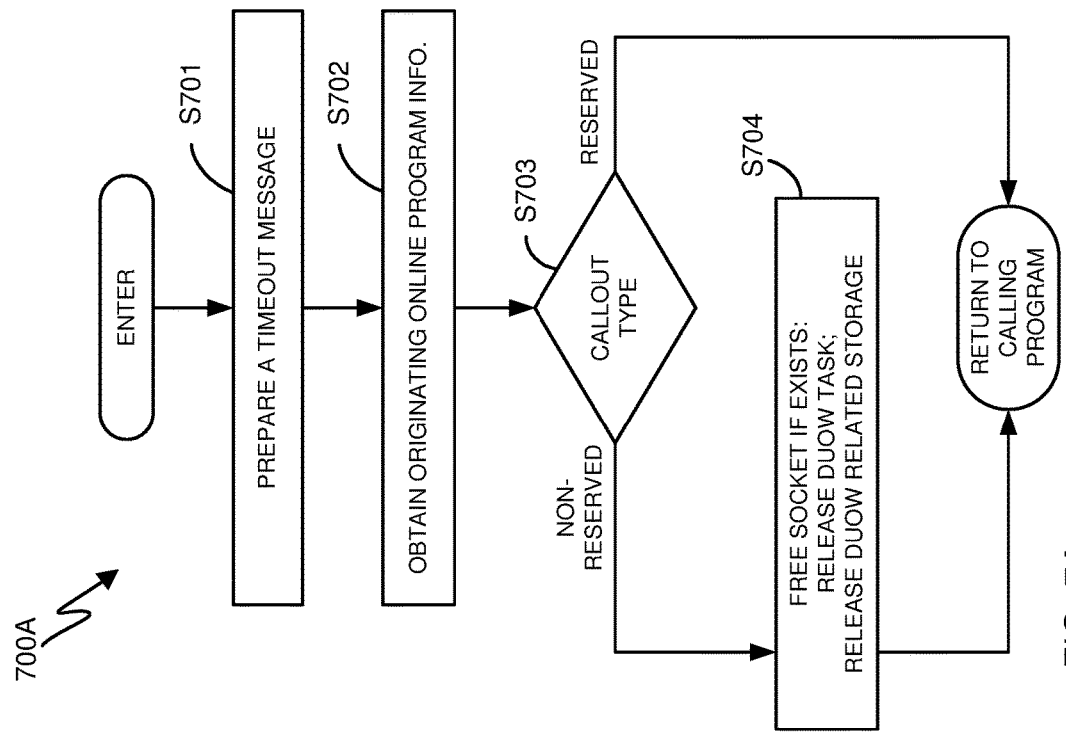
FIG. 7A is a flowchart showing a method performed, at least in part, by a callout cleanup process, in accordance with at least one embodiment of the present invention.

Flowchart 700A of FIG. 7A shows a machine logic (for example, software) portion of a callout cleanup operation performed when a DUOW state equals "timer pops", in accordance with some embodiments of the present invention. Flowchart 700A (Logic-A) includes the following operations (with process flow among and between the operations as shown by arrows in FIG. 7A: S701, S702, S703, and S704. Logic-A is at least a portion of a machine logic method that is called to clean up a callout when the associated DUOW state is "Timer pops".

Flowchart 700B of FIG. 7B shows a machine logic (for example, software) portion of a sharing mode send operation in accordance with some embodiments of the present invention. Flowchart 700B (Logic-B) includes the following operations (with process flow among and between the operations as shown by arrows in FIG. 7B: S710, S711, S712, S713, S714, and S715. Logic-B is at least a portion of a machine logic method that is called to send a shared message, when: (i) the shared message has reached a size threshold; or (ii) a timeout interval has expired.

Figure 8:
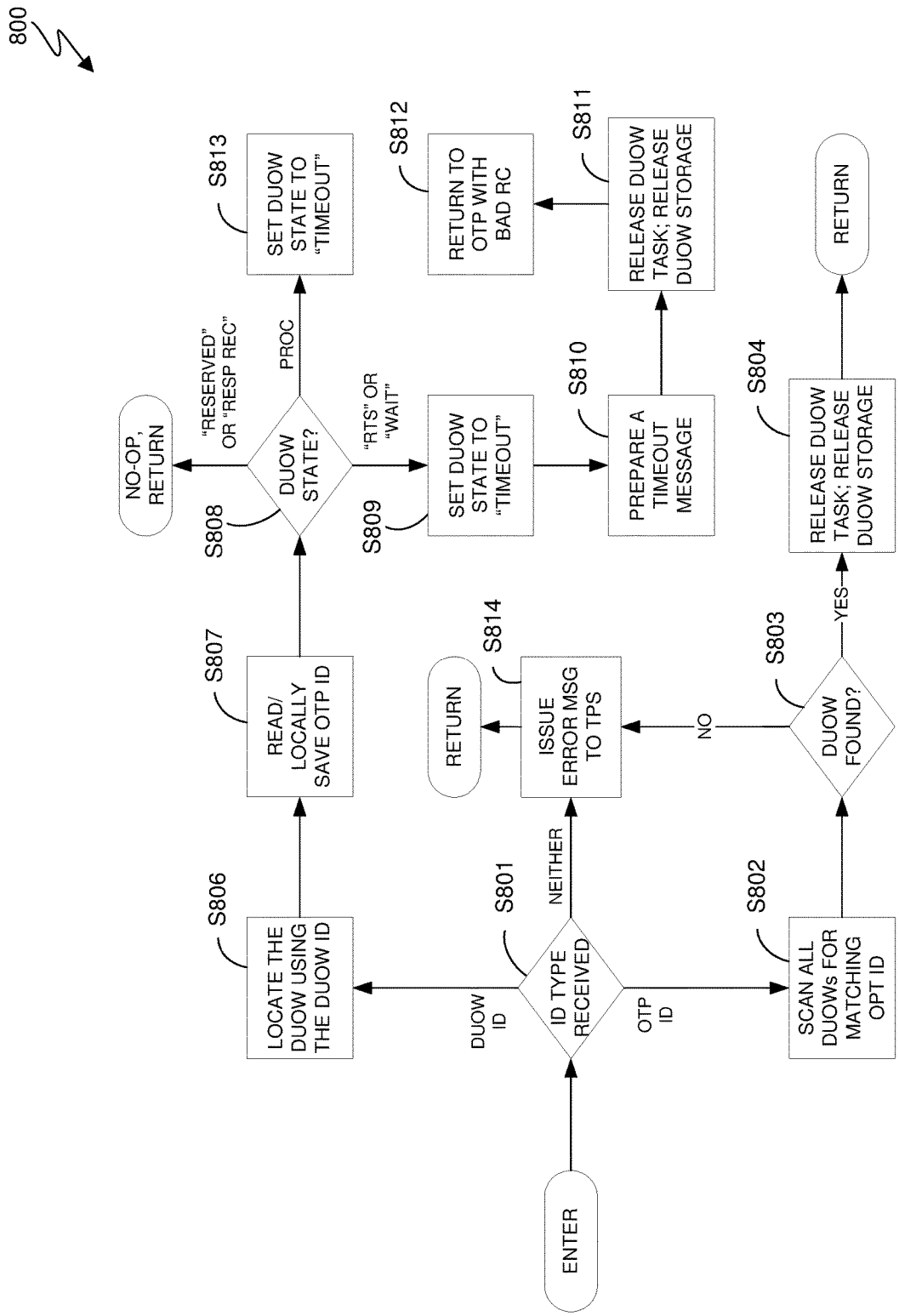
FIG. 8 is a flowchart showing a method performed, at least in part, by a dispatchable unit of work (DUOW) cleanup process, in accordance with at least one embodiment of the present invention.

Flowchart 800 of FIG. 8 shows a machine logic (for example, software) portion of a DUOW cleanup processor in accordance with some embodiments of the present invention. Flowchart 800 (Logic-D) includes the following operations (with process flow among and between the operations as shown by arrows in FIG. 8: S801, S802, S803, S804, S806, S807, S808, S809, S810, S811, S812, S813, and S814. Logic-D (DUOW cleanup processor) is at least a portion of a machine logic method that is called, in some embodiments of the present invention, to cleanup a DUOW when the DUOW is no longer needed.

With respect to decision S801 (ID type received): If a DUOW timer pops, the calling program passes a DUOW ID in a call to Logic-D, to clean up the corresponding DUOW. Consequently, processing proceeds at operation S806 ("DUOW ID" branch). If an online transaction program (OTP) terminates having a reserved DUOW, the calling program passes an OTP ID in a call to Logic-D. Consequently, processing proceeds at operation S802 ("OTP ID" branch). If the calling program passes neither a DUOW ID nor an OTP ID, processing proceeds to operation S814 ("NEITHER" branch).

With respect to operation S807 (Read/locally save OTP ID): The originating OTP ID is obtained from the DUOW ID and locally saved for return.

With respect to decision S808 (DUOW state?): (i) if the DUOW state is "reserved" or "response received" ("RESERVED" or "RESP REC" branch), processing ends; (ii) if DUOW state is "ready to send" or "wait for a response" ("RTS" or "WAIT" branch), processing proceeds at operation S809; (iii) if the DUOW state is "processing" ("PROC" branch), processing proceeds at operation S813.

With respect to operation S812 (Return to OTP with bad RC): The OTP ID that was saved in operation S807 is referenced to return to the originating OTP with a bad return code.

Figure 9:
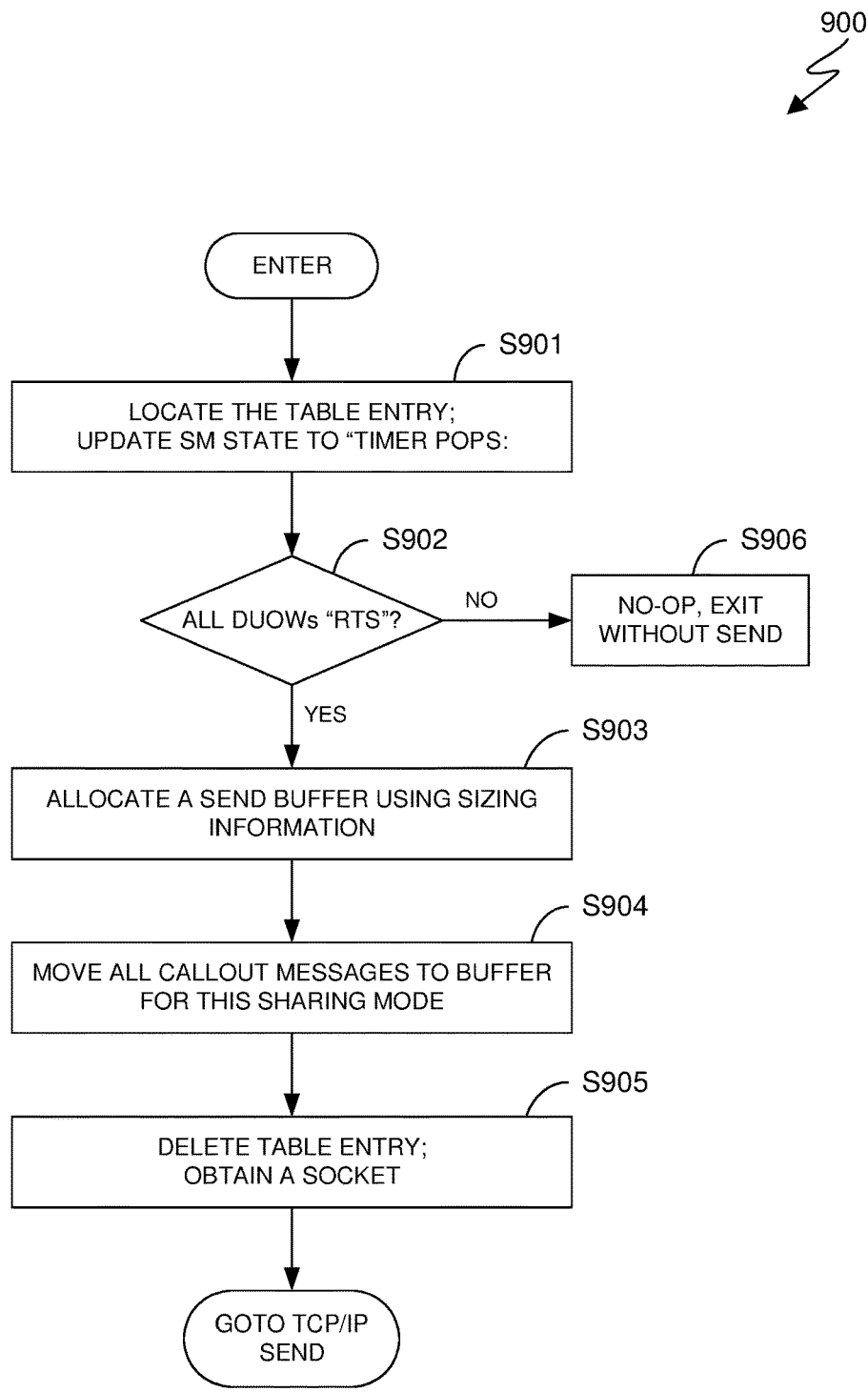
FIG. 9 is a flowchart showing a method performed, at least in part, by a sharing mode timeout process, in accordance with at least one embodiment of the present invention.

Flowchart 900 of FIG. 9 shows a machine logic (for example, software) portion of a sharing mode timeout processor in accordance with some embodiments of the present invention. Flowchart 900 (Logic-E) includes the following operations (with process flow among and between the operations as shown by arrows in FIG. 9: S901, S902, S903, S904, S905, and S906. Logic-E (sharing mode timeout processor) is at least a portion of a machine logic method that is called, in some embodiments of the present invention, when the sharing mode timer pops.

In some embodiments of the present invention, possible states of a DUOW for callout include the following states:

Reserved—Initial state for a reserved DUOW.

Processing—Callout Performance Booster (CPB) is processing a callout request with its DUOW; initial state for a non-reserved DUOW.

Ready-to-Send—A callout message, using the sharing mode, is ready to be delivered to the external TCP/IP server. Valid only for a non-reserved and non-priority callout messages.

Wait-for-Response—A synchronous callout message is sent via TCP/IP and a response is not yet received.

Response Received—A response for synchronous callout is received.

Timer Pops—A callout timer pops (times out) based on the timeout value specified in the callout message. A callout timer is activated after a DUOW is created for a callout message.

Sharing Mode for Callout Messages

In some embodiments of the present invention, a set of callout messages is delivered by a single TCP/IP SEND using a single socket. The set of callout messages is managed with reference to a "destination table". Each entry in the destination table includes TCP/IP address information, sharing mode state, sharing mode timer token, current message sizing, and DUOW chain address. Destination table entries can be queried, updated, added, and deleted.

In some embodiments of the present invention, possible sharing mode states include these states: active; full; and timer pops. Table 1—Example Destination Table, below, shows a contrived example of a destination table in accordance with some embodiments of the present invention:

TABLE 1

Example Destination Table.

| TCP/IP address | Sharing mode state | Timer token | Current message sizing (bytes) | DUOW Chain address |
|---|---|---|---|---|
| xx.xx.xx.x | ACTIVE | 00001 | 1K | 12340 |
| yy.yy.yy.y | ACTIVE | 00005 | 2K | 45690 |
| yy.yy.yy.y | Timer Pops | 00003 | 32K | 34580 |
| zz.zz.zz.z | ACTIVE | 00008 | 3K | 78880 |
| zz.zz.zz.z | FULL | 00006 | 50K | 66540 |

With respect to potential advantages disclosed herein and provided by embodiments of the present invention, some embodiments may not have these potential advantages and these potential advantages are not necessarily required of all embodiments.

Figure 10:
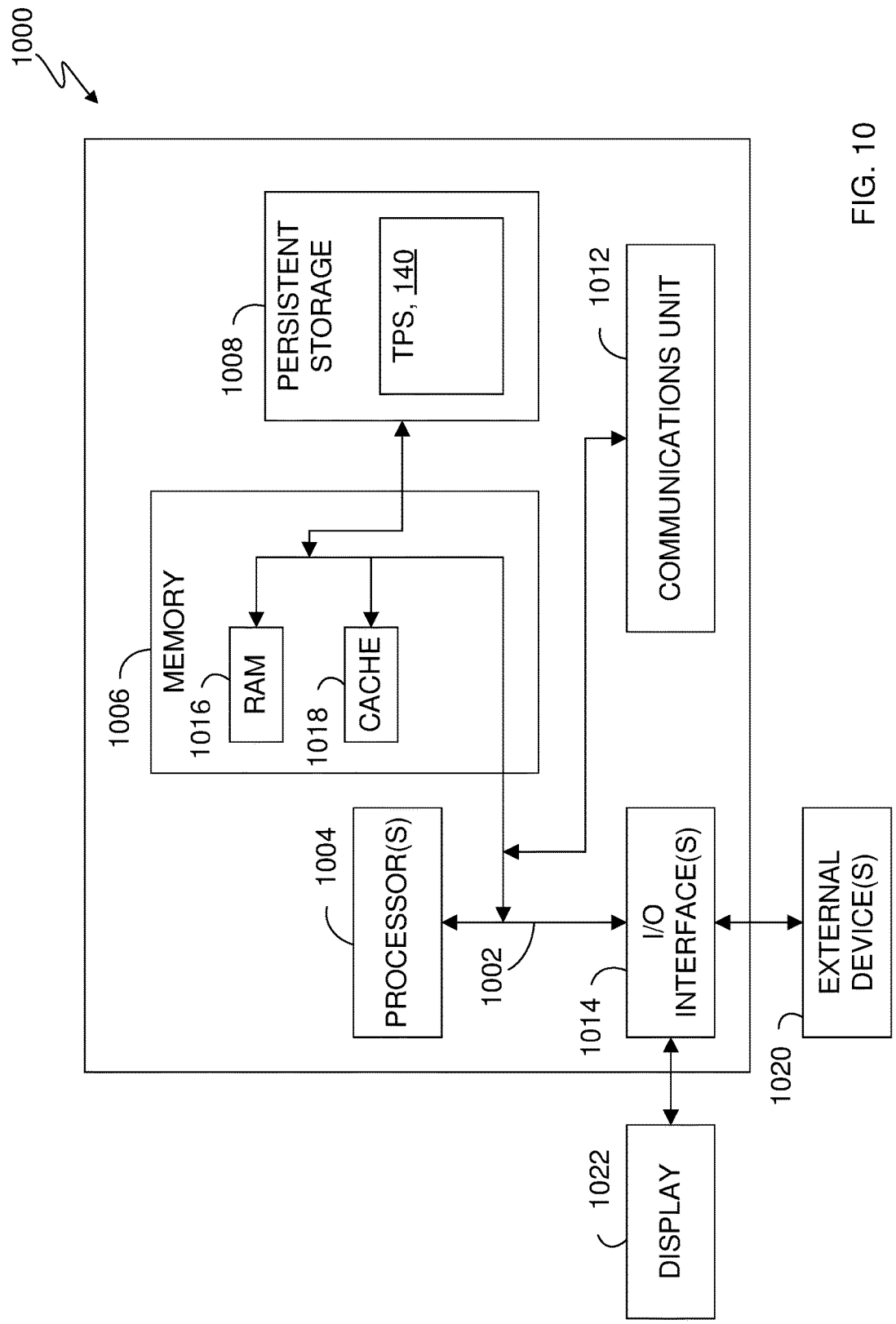
FIG. 10 is a block diagram depicting components of a computer, in accordance with at least one embodiment of the present invention.

FIG. 10 depicts a block diagram of components of computer 1000 in accordance with an illustrative embodiment of the present invention. It should be appreciated that FIG. 10 provides only an illustration of one implementation and does not imply any limitations with regard to the environments in which different embodiments may be implemented. Many modifications to the depicted environment may be made.

As depicted, the computer 1000 includes communications fabric 1002, which provides communications between computer processor(s) 1004, memory 1006, persistent storage 1008, communications unit 1012, and input/output (I/O) interface(s) 1014. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses.

Memory 1006 and persistent storage 1008 are computer-readable storage media. In this embodiment, memory 1006 includes random access memory (RAM) 1016 and cache memory 1018. In general, memory 1006 can include any suitable volatile or non-volatile computer-readable storage media.

One or more programs may be stored in persistent storage 1008 for access and/or execution by one or more of the respective computer processors 1004 via one or more memories of memory 1006. In this embodiment, persistent storage 1008 includes a magnetic hard disk drive. Alternatively, or in addition to a magnetic hard disk drive, persistent storage 1008 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer-readable storage medium that is also part of persistent storage 1008.

Communications unit 1012, in these examples, provides for communications with other data processing systems or devices. In these examples, communications unit 1012 includes one or more network interface cards. Communications unit 1012 may provide communications through the use of either or both physical and wireless communications links.

I/O interface(s) 1014 allows for input and output of data with other devices that may be connected to computer 1000. For example, I/O interface 1014 may provide a connection to external devices 1020 such as a keyboard, keypad, a touch screen, and/or some other suitable input device. External devices 1020 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 1008 via I/O interface(s) 1014. I/O interface(s) 1014 also connect to a display 1022.

Display 1022 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

Definitions

Dispatchable unit of work (DUOW): a set of control blocks that represent a unit of work in a transaction processing system (TPS); a DUOW includes information associated with a callout message such as originating transaction program identifier (ID), DUOW state, socket information, target TCP/IP address information, address of destination table entry and sharing mode timer token; in some embodiments of the present invention, a DUOW is activated or dispatched via a scheduler of the TPS; a DUOW is terminated when a callout message completes, or the originating transaction program ends.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
receiving a call from a first online transaction program (first OTP);
in response to receiving the call:
generating an express socket path,
generating a dispatchable unit of work and a corresponding token identifier (token ID),
sending the token ID to the first OTP;
receiving, from the first OTP a first callout message, where the first callout message includes the token ID;
sending the first callout message on the express socket path;
receiving a first response corresponding to the first callout message;
sending the first response to the first OTP;
receiving a plurality of callout messages from one or more second online transaction programs (second OTPs);
combining the plurality of callout messages into a shared callout message;
sending the shared callout message to a TCP/IP server;
receiving a shared return message from the TCP/IP server;
extracting a plurality of return messages from the shared return message; and
returning the plurality of return messages to respectively corresponding one or more second OTPs.

2. The method of claim 1, further comprising:
receiving, from the first OTP a second callout message, where the second callout message includes the token ID;
sending the second callout message on the express socket path;
receiving, a second response corresponding to the second callout message; and
sending the second response to the first OTP.

3. The method of claim 1, further comprising:
receiving a signal indicating that the first OTP has terminated;
in response to receiving the signal, terminating the dispatchable unit of work.

4. The method of claim 1, further comprising:
receiving a second callout message where the second callout message is of a first priority level;
assigning an available socket to the second callout message;
receiving a third callout message where the third callout message is of a second priority level;
reassigning the available socket to the third callout message.

5. A computer program product comprising:
one or more computer readable storage media and program instructions stored on the one or more computer readable storage media, the program instructions comprising instructions to perform:
receiving a call from a first online transaction program (first OTP);
in response to receiving the call:
generating an express socket path,
generating a dispatchable unit of work and a corresponding token identifier (token ID),
sending the token ID to the first OTP;
receiving, from the first OTP a first callout message, where the first callout message includes the token ID;

sending the first callout message on the express socket path;
receiving a first response corresponding to the first callout message;
sending the first response to the first OTP;
receiving a plurality of callout messages from one or more second online transaction programs (second OTPs);
combining the plurality of callout messages into a shared callout message;
sending the shared callout message to a TCP/IP server;
receiving a shared return message from the TCP/IP server;
extracting a plurality of return messages from the shared return message; and
returning the plurality of return messages to respectively corresponding one or more second OTPs.

6. The computer program product of claim 5, further comprising instructions to perform:
receiving, from the first OTP a second callout message, where the second callout message includes the token ID;
sending the second callout message on the express socket path;
receiving, a second response corresponding to the second callout message; and
sending the second response to the first OTP.

7. The computer program product of claim 5, further comprising instructions to perform:
receiving a signal indicating that the first OTP has terminated;
in response to receiving the signal, terminating the dispatchable unit of work.

8. The computer program product of claim 5, further comprising instructions to perform:
receiving a second callout message where the second callout message is of a first priority level;
assigning an available socket to the second callout message;
receiving a third callout message where the third callout message is of a second priority level;
reassigning the available socket to the third callout message.

9. A computer system comprising:
one or more computer processors;
one or more computer-readable storage media;
program instructions stored on the computer-readable storage media for execution by at least one of the one or more processors, the program instructions comprising instructions to perform:
receiving a call from a first online transaction program (first OTP);
in response to receiving the call:
generating an express socket path,
generating a dispatchable unit of work and a corresponding token identifier (token ID),
sending the token ID to the first OTP;
receiving, from the first OTP a first callout message, where the first callout message includes the token ID;
sending the first callout message on the express socket path;
receiving a first response corresponding to the first callout message;
sending the first response to the first OTP;
receiving a plurality of callout messages from one or more second online transaction programs (second OTPs);
combining the plurality of callout messages into a shared callout message;
sending the shared callout message to a TCP/IP server;
receiving a shared return message from the TCP/IP server;
extracting a plurality of return messages from the shared return message; and
returning the plurality of return messages to respectively corresponding one or more second OTPs.

10. The computer system of claim 9, further comprising instructions to perform:
receiving, from the first OTP a second callout message, where the second callout message includes the token ID;
sending the second callout message on the express socket path;
receiving, a second response corresponding to the second callout message; and
sending the second response to the first OTP.

11. The computer system of claim 9, further comprising instructions to perform:
receiving a signal indicating that the first OTP has terminated;
in response to receiving the signal, terminating the dispatchable unit of work.

12. The computer system of claim 9, further comprising instructions to perform:
receiving a second callout message where the second callout message is of a first priority level;
assigning an available socket to the second callout message;
receiving a third callout message where the third callout message is of a second priority level;
reassigning the available socket to the third callout message.

* * * * *